United States Patent
D'Angelo et al.

(10) Patent No.: US 8,140,565 B2
(45) Date of Patent: Mar. 20, 2012

(54) AUTONOMIC INFORMATION MANAGEMENT SYSTEM (IMS) MAINFRAME DATABASE POINTER ERROR DIAGNOSTIC DATA EXTRACTION

(75) Inventors: Dario D'Angelo, Los Gatos, CA (US);
Charles E. Jones, Antioch, CA (US);
Kin Lau, Mountain View, CA (US);
Alan R. Smith, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 12/356,394

(22) Filed: Jan. 20, 2009

(65) Prior Publication Data
US 2010/0185590 A1    Jul. 22, 2010

(51) Int. Cl.
*G06F 7/00* (2006.01)
*G06F 17/30* (2006.01)
(52) U.S. Cl. .................................. 707/769; 714/799
(58) Field of Classification Search .............. 707/769
See application file for complete search history.

(56) References Cited

U.S. PATENT DOCUMENTS

| | | | |
|---|---|---|---|
| 5,995,980 A | 11/1999 | Olson et al. | |
| 6,092,085 A | 7/2000 | Keene | |
| 6,154,753 A | 11/2000 | McFarland | |
| 6,574,671 B1 | 6/2003 | Haynes | |
| 6,816,863 B2 | 11/2004 | Bates et al. | |
| 6,934,949 B2 * | 8/2005 | Smith et al. | 718/101 |
| 6,952,805 B1 | 10/2005 | Tafoya et al. | |
| 6,961,925 B2 | 11/2005 | Callahan, II et al. | |
| 7,200,588 B1 | 4/2007 | Srivastava et al. | |
| 7,305,427 B2 | 12/2007 | Kaye | |
| 7,328,251 B2 | 2/2008 | Ahmed et al. | |
| 7,409,353 B1 | 8/2008 | Uslontsev et al. | |
| 7,426,496 B2 | 9/2008 | Kristjansson | |
| 7,805,675 B2 | 9/2010 | Cradick et al. | |
| 2002/0023024 A1 | 2/2002 | Kaimowitz | |
| 2005/0114365 A1 | 5/2005 | Tucker | |
| 2005/0180038 A1 | 8/2005 | Chikashige et al. | |
| 2005/0223283 A1 | 10/2005 | Frey et al. | |
| 2005/0240638 A1 * | 10/2005 | Fisher | 707/205 |
| 2006/0026244 A1 | 2/2006 | Watson | |
| 2006/0026641 A1 | 2/2006 | Jule et al. | |

(Continued)

OTHER PUBLICATIONS

IBM Software Group, IMS problem Investigator, Verson 1.2, Analyzing the IMS, CQS, and Connect logs to investigate problems, Jul. 2005, IBM Corporation and Fundi Software.*

(Continued)

*Primary Examiner* — Apu Mofiz
*Assistant Examiner* — Mohammad Rahman
(74) *Attorney, Agent, or Firm* — Kunzler Needham Massey & Thorpe

(57) ABSTRACT

A method and system for autonomic Information Management System (IMS) mainframe database pointer error diagnostic data extraction. A receiving module may receive a database name and an error detection time. An error detection module may locate database pointer errors on the failed IMS database. A list module may generate an Image Copy (IC) list corresponding to the failed database. A code generation module may generate Job Control Language (JCL) code for the selected entries in the IC list. An execution module executes the JCL code which operates a pointer checker utility on each clean IC. A log list module locates log data sets recorded in the time between the error and when the error was detected and an extraction module extracts an evaluation log list which comprises evaluation log data sets.

6 Claims, 3 Drawing Sheets

U.S. PATENT DOCUMENTS

| | | |
|---|---|---|
| 2006/0031267 A1 | 2/2006 | Lim et al. |
| 2006/0036691 A1 | 2/2006 | Schultz |
| 2006/0080270 A1 | 4/2006 | Mori |
| 2006/0150163 A1 | 7/2006 | Chandane |
| 2006/0156210 A1 | 7/2006 | Ranson et al. |
| 2006/0235820 A1 | 10/2006 | Hoth et al. |
| 2006/0277162 A1 | 12/2006 | Smith |
| 2007/0005598 A1 | 1/2007 | Okamoto et al. |
| 2007/0043775 A1 | 2/2007 | Mori et al. |
| 2007/0055687 A1 | 3/2007 | Josten et al. |
| 2007/0078865 A1 | 4/2007 | Smith |
| 2007/0136082 A1 | 6/2007 | Jackson et al. |
| 2007/0250576 A1 | 10/2007 | Kumar et al. |
| 2007/0282878 A1 | 12/2007 | Marshall |
| 2008/0040435 A1 | 2/2008 | Buschi et al. |
| 2008/0109736 A1 | 5/2008 | Itoh |
| 2008/0147816 A1 | 6/2008 | Damm et al. |
| 2008/0168352 A1 | 7/2008 | Mehrotra et al. |
| 2008/0313283 A1 | 12/2008 | Cohen et al. |
| 2009/0100347 A1 | 4/2009 | Schemers et al. |
| 2009/0125596 A1 | 5/2009 | Naick et al. |
| 2010/0003948 A1 | 1/2010 | Ray |

OTHER PUBLICATIONS

IMS Version 9, Knowledge Based Log Analysis KBLA, IBM Corp, 2005.*

Harper, John, "IMS Full Function Database Log Record Analysis", IBM Information on Demand 2006, Anaheim Convention Center, Oct. 15-20, 2006. 42 Pages.

Nystrom, Dag, et al., "Snapshots in Real-Time Databases using Database Pointer Transactions", Proceedings of the 11th IEEE International Conference on Embedded and Real-Time Computer Systems and Applications, 2005. 7 Pages.

"IBM IMS Database Analysis Tools", IBM, Apr. 2003.

"Pointer Checker Plus", BMC Software, Release Notes, Version 4.4.01, Jul. 30, 2004.

Jones et al., "Management of Data Needed to Resolve Pointer Errors in Hierarchical Database Management System", Aug. 27, 2007.

Underhill, Rachel, Effective Emails, Web and Information Manager, Mar. 19, 2008.

Oluwa, Lola, Dynamic Determination of e-mail recipient, Apr. 24, 2011.

IBM Software Group-IMS: IMS Problem Investigator, Version 1.2. Analyzing the IMS, CQS, and Connect logs to investigate problems, Juy 2005.

Wikipedia, IBM Information Management System, Retrieved Sep. 22, 2009.

Jantti, Jouko et al., IBM, IMS Version 9 Implementation Guide: A Technical Overview, Redbooks, Dec. 2004.

IBM Corporation, Knowledge Based Log Analysis, KBLA, IMS Version 9, Jan. 2005.

Office Action received from USPTO, U.S. Appl. No. 12/201,393, Notification Date Sep. 2, 2010.

Office Action received from USPTO, U.S. Appl. No. 12/201,393, Notification Date Feb. 22, 2011.

Office Action received from USPTO, U.S. Appl. No. 11/845,710, Notification Date Oct. 1, 2009.

Information Disclosure Statement, U.S. Appl. No. 12/645,403, Filed Oct. 13, 2011.

* cited by examiner

AUTONOMIC INFORMATION MANAGEMENT SYSTEM (IMS) MAINFRAME DATABASE POINTER ERROR DIAGNOSTIC DATA EXTRACTION

BACKGROUND OF THE INVENTION

1. Field of the Invention

The invention relates to database pointer error diagnostics. Particularly, the invention relates to autonomic Information Management System (IMS) mainframe database pointer error diagnostic data extraction.

2. Description of the Related Art

When IMS databases on mainframe computers experience a "pointer error" showing that the database is damaged in some way, the database administrator will often collect diagnostic data in an effort to identify the problem. However, this problem source identification and diagnostic data collection is fairly complicated and require significant experience and specific skill. Furthermore, the large quantities of IMS log and trace data requiring analysis makes the problem source identification of a database pointer error a very time consuming operation.

Application abends, messages, ad-hoc utilities output, and pointer checker reports can provide diagnostic clues identifying the affected database name, the associated pointer errors, and other relevant information. However, the process of determining the cause of a database pointer error includes manually locating a clean Image Copy (IC) of the database for recovery usage and running a pointer checker utility on each potential IC to determine if the IC is suitable for recovery.

In addition, sifting through the enormous amount of log records between the error occurrence and the pointer error detection is a daunting task involving the screening of millions of records.

SUMMARY OF THE INVENTION

The present invention has been developed to provide a method and system for autonomic Information Management System (IMS) mainframe database pointer error diagnostic data extraction. The method provides a plurality of modules configured to functionally perform the necessary steps. These modules include a receiving module, an error detection module, a list module, an IC extraction module, a code generation module, an execution module, a log list module, and a log extraction module. The receiving module may receive a database name, corresponding to a failed IMS database, and an error detection time. The error detection module of a pointer checker utility may locate one or more database pointer errors which exist on the failed IMS database.

The list module may utilize an IMS Data Base Recovery Control facility (DBRC) LIST.DBDS command to generate an Image Copy (IC) list which corresponds to the failed IMS database and comprises one or more entries. The entries may be ordered from youngest to oldest in time. Each entry may comprise a runtime timestamp and IC data set name. The IC extraction module 216 extracts one or more entries in the IC list which correspond to a clean (BATCH) IC.

The code generation module may generate a Job Control Language (JCL) code block for each clean IC. The JCL code block references the runtime timestamp and the IC data set name of the clean IC from the entry in the IC list corresponding to the clean IC. The execution module executes each JCL code block so long as the JCL code block returns an unsuccessful pointer checker return code. Each JCL code block operates an IC pointer checker utility on each clean IC.

The log list module of a mainframe RECON Query of Log Data Set Names utility (DFSKARC0) locates one or more log data sets in response to a successful pointer checker return code on the youngest clean IC. The one or more log data sets maybe recorded between the error detection time and the runtime timestamp from the entry associated with the youngest clean IC. The log extraction module extracts an evaluation log list which comprises one or more evaluation log data sets. Each evaluation log data set comprises a change operation identifier and at least one of the one or more database pointer errors.

In one embodiment, the method may further comprise an output module which sends at least a portion of the evaluation log list to a service center. In another embodiment, the output module may send an affected data set list to a predetermined receiver.

A system of the present invention is also presented for autonomic IMS database pointer error diagnostic data extraction. The system maybe embodied as a network configured to communicate data between a plurality of devices, IMS in communication with the network, and a diagnostic server in communication with the network. Moreover, the diagnostic server may comprise similar modules as described above in relation to the method.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
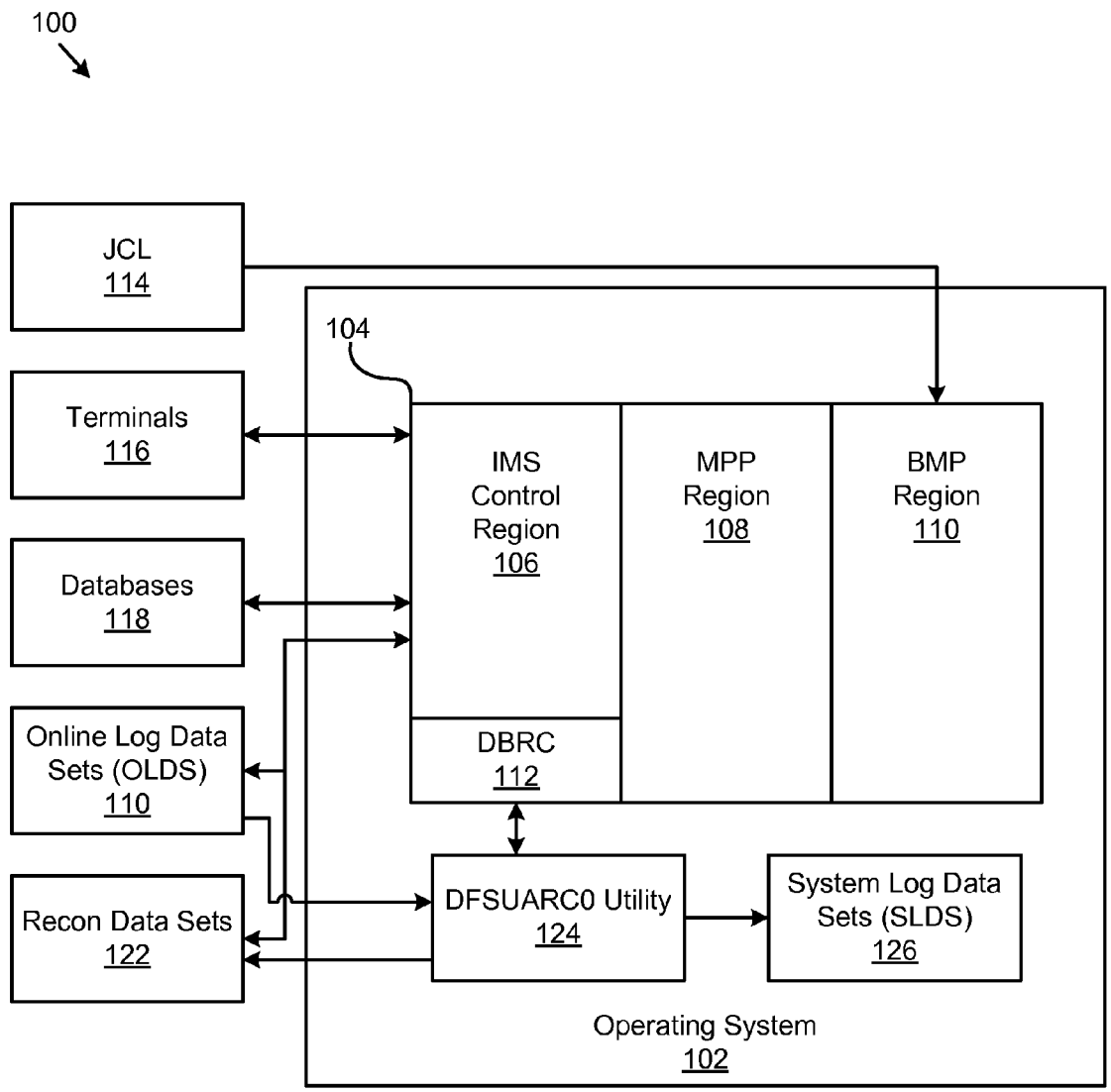
FIG. 1 is a schematic block diagram illustrating one embodiment of an IMS.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium maybe utilized. The computer-usable or computer-readable medium may be, for example but not limited to, an electronic, magnetic, optical, electromagnetic, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 1 illustrates one embodiment of an IMS. As known in the art, IMS is a database and information management system configured to handle a large quantity of database transactions. An operating system 102, such as the z/OS operating system, may manage the resources and operations of the system (z/OS is a trademark of International Business Machines Corporation). The z/OS operating system 102 may operate on a zSeries mainframe computer system or other such mainframe system (zSeries is a trademark of International Business Machines Corporation). The z/OS operating system 102 may also run on a virtual machine on one such mainframe computer. In addition, the z/OS operating system may run the IMS subsystem 104. Furthermore, the IMS subsystem 104 comprises an IMS Control region 106 which manages the region resources including the Message Processing Program (MPP) region 108 and the BMP region 110. Furthermore, a Data Base Recovery Control (DBRC) region 112 provides database recovery and facilitates database sharing between IMS systems.

One utility used by the DBRC region is the DFSUARC0 utility 124, a log archive utility. The DFSUARC0 124 may be in communication with the System Log Data Sets (SLDS) 126.

As known in the art, data sets are a form of structured file storage on a mainframe computer. Furthermore, log data sets are useful to restore a database if a failure occurs, to troubleshoot database problems, or to redo failed transactions recorded therein. Log data sets may be classified as SLDS 126 as previously mentioned, Recovery Log Data Sets (RLDS), Online Log Data Set (OLDS) 110, or Recon Data Sets 122.

Other resources that communicate with or are managed by the IMS subsystem 104 include terminals 116, one or more databases 118, and Job Control Language (JCL) 114. The databases 118 may comprise several types of IMS databases including DEDB, HDAM, HIDAM, and HISAM. Futhermore, the databases 118 may be in communication with multiple IMS systems.

Figure 2:
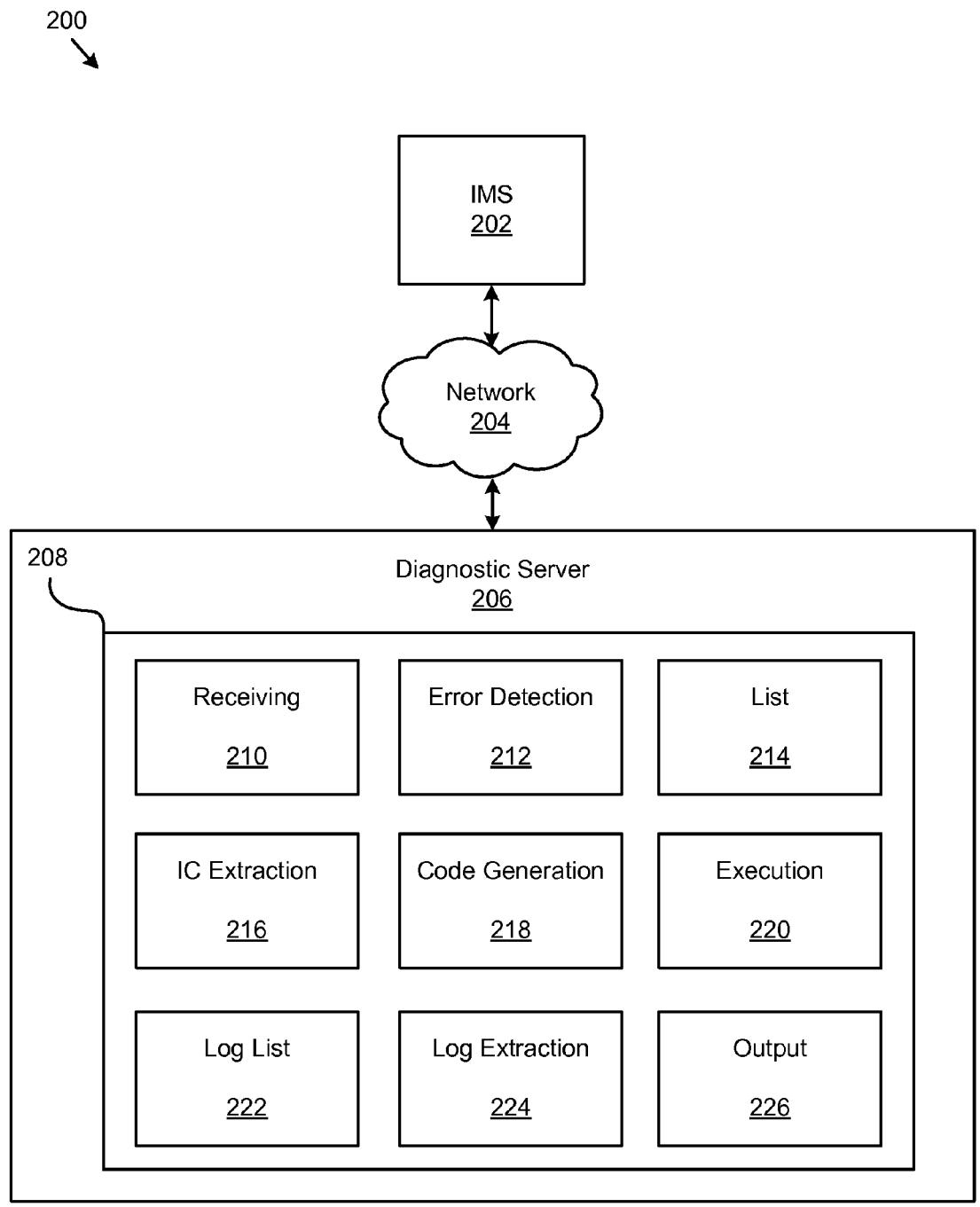
FIG. 2 is a schematic block diagram illustrating one embodiment of a system and the accompanying modules for autonomic IMS database pointer error diagnostic data extraction.

FIG. 2 illustrates one embodiment of a system 200 for autonomic IMS database pointer error diagnostic data extraction. The system 200 may include an IMS 202, a network 204, and a diagnostic server 206 with a pointer error data extractor 208. Furthermore, the IMS 202 may comprise the IMS depicted in FIG. 1. Those of skill in the art recognize that the system 200 may be simpler or more complex than illustrated, so long as the system 200 includes modules or sub-systems that correspond to those described herein. The network 204 may comprise a Local Area Network ("LAN") or the Internet.

In addition, the diagnostic server 206 may also comprise an IBM System z/OS or other mainframe computer. The diagnostic server 206 may reside on a separate mainframe computer than the IMS 202, although both the IMS 202 and the diagnostic server 206 may share residence in different virtual machines on the same mainframe computer in some embodiments. Regardless, the diagnostic server 206 must have access to IMS log records stored in data set format and created by the IMS 202 or multiple IMS systems 202 in response to database transactions and other activity.

To enable access to the log data sets for the diagnostic server 206, the log data sets may reside on shared Direct Access Storage Devices (DASDs), may be shipped across systems for access by the diagnostic server 206, or may be shared by other file or data set sharing means known in the art. Moreover, the diagnostic server 206 may also be in communication with multiple IMS systems 202, having access to multiple groups of log data sets, and processing those sets.

Due to the potential for multiple IMS systems 202 to access the IMS databases 118, each system may generate massive amounts of log data sets corresponding to thousands of transactions. When a database error occurs, a trained operator sifts through these log data sets to diagnose the problem and restore the failed portion of the database 118. In addition to the skill this process requires and even with existing utilities to aid the process, the sheer magnitude of the data that must be sorted through requires a great deal of time.

Therefore, the diagnostic server 206 may include a pointer error data extractor 208. The pointer error data extractor 208 may comprise an apparatus with a receiving module 210, an error detection module 212, a list module 214, an IC extraction module 216, a code generation module 218, an execution module 220, a log list module 222, a log extraction module 224, and, in some embodiments, an output module 226.

In one embodiment, the receiving module 210 receives a database name and an error detection time. In IMS, the database name may be identified by a Database Descriptor (DBD) which describes the physical structure and location of a database 118. The database name received by the receiving module 210 references the IMS database 118 which has failed or in which the error occurred. Furthermore, the error detection time may be the time at which a database administrator or other user first noticed the database error, thereby alleviating a need to examine log data sets recorded after the error detection time, as the error had already occurred. The database name and error detection time may be received by the receiving module 210 through user input from an application on a user's workstation, manual submission of the information, an Interactive System Productivity Facility (ISPF) panel, or the like.

In certain embodiments, an error detection module 212 locates the database pointer errors that exist on the failed IMS database 118. The error detection module 212 utilizes a pointer checker utility, an existing utility that references pointer errors, or the direct address of the data block in which the problem data is stored. The pointer errors for the failed database 118 may be stored in a temporary work data set.

In one embodiment, a list module 214 generates an Image Copy (IC) list corresponding to the failed IMS database 118. An IC is a backup copy of the database 118 which is a "snapshot," or representation of the exact state of the database 118 at a certain point in time during the life cycle of one or more IMS subsystems 104 which process the database. The list module 214 may utilize an existing IMS DBRC LIST.DBDS command to generate this list. The IC list may have several entries with each entry including a runtime timestamp and IC data set name (DSN), or the specific data set in which the IC is stored. Furthermore, the list may be ordered in time from youngest to oldest. The IC list may be used to identify ICs which are "clean" or free of pointer errors and viable candidates to be used as a backup. A clean IC is usually a BATCH IC, which indicates that the database was offline and unavailable for update when the database copy was taken, allowing the IC to be an exact representation of the database at the time the IC was taken.

The following is an abridged example of the output of a DBRC LIST.DBDS command showing several entries:

Example Output 1

```
DBDS
  DSN=IMSTESTL.DHVNTZ02.FKXXI01E
  DBD=DHVNTZ02 DDN=HIDAM DSID=001 DBORG=HIDAM
  DSORG=VSAM
  IMAGE
    RUN = 07.312 13:06:35.4        * RECORD COUNT
    STOP = 00.000 00:00:00.0         BATCH
  IC1
    DSN=IMSVS.DHVNTZ02.HIDAM.IC.IC130400
    UNIT=SYSDA             VOLS DEF=0001
                           VOLSER=111111
  IMAGE
    RUN = 07.312 15:32:22.9        * RECORD COUNT
    STOP = 07.312 15:32:23.0         CONCUR
```

-continued

Example Output 1

```
IC1
   DSN=IMSVS.DHVNTZ02.HIDAM.IC.IC1CIC1
   UNIT=SYSDA          VOLS DEF=0001
                       VOLSER=555555
   IMAGE
      RUN = 07.312 13:09:15.6      * RECORD COUNT
      STOP = 00.000 00:00:00.0       BATCH
IC1
   DSN=IMSVS.DHVNTZ02.HIDAM.IC.IC130500        FILE SEQ
   UNIT=SYSDA          VOLS DEF=0001 VOLS USE
                       VOLSER=222222
   IMAGE
      RUN = 07.312 13:11:27.0      * RECORD COUNT
      STOP = 00.000 00:00:00.0       BATCH      USID
IC1
   DSN=IMSVS.DHVNTZ02.HIDAM.IC.IC130600        FILE SEQ
   UNIT=SYSDA          VOLS DEF=0001 VOLS USE
                       VOLSER=333333
```

In this example, the first, third and fourth IC data sets are viable candidates—they are BATCH copies which are clean. The second IC data set is not a viable candidate—it is a CONCUR copy which is known in the art as "fuzzy," or a copy which may not be transactionally consistent. Each suitable IC is referenced by its DSN. In Example Output 1, the name of the first IC is DSN=IMSVS.DHVNTZ02.HIDAM.IC.IC130400. In addition, each IC has a corresponding time stamp which identifies the time the IC was captured.

In one embodiment, the IC extraction module 216 receives the IC list as input and parses the IC list. The IC extraction module 216 may extract the entry for each clean IC including the timestamp and DSN.

[042] In one embodiment, the code generation module 218 generates a Job Control Language (JCL) code block for each of the clean ICs. As known in the art, JCL is a batch processing language used on mainframe computers.

The code generation module 218 may utilize a JCL code block skeleton to simplify the code generation process. The code generation module 218 may map the IC specific data into the skeleton body. Example Code 1 displays one embodiment of a JCL code block skeleton:

Example Code 1

```
//S#1   EXEC    PROC=PTRCHECK,COND=(0,EQ)
//ICDDNAME DD DISP=SHR,
//   DSN=#2
//N#1   EXEC    PROC=DFSKARC0,COND=(0,NE,S#1)
//CONTROL  DD *
    STRTTIME=#3
    STOPTIME=20073142100000
//****************************************
```

Variables #1, #2, and #3 are places in the skeleton where the IC name data is mapped into the skeleton. Variable #1 represents a count that is incremented for each set of steps. Variable #2 represents the image copy data set name mapped into the JCL. Finally, variable #3 represents the run time extracted from the LIST.DBDS output. In Example Code 1, the STOP-TIME was set to the time at which the database error was encountered. In this example, the time is: 20073142100000. PROC=PTRCHECK identifies a JCL procedure, PTRCHECK, which contains static JCL code for performing the pointer check. DFSKARC0 identifies a utility to parse the results returned from the DBRC LIST.LOG command to generate a list of the logs which have been created since a given IC was captured.

Example Code 2 demonstrates possible output from the code generation module 218:

Example Code 2

```
//S01   EXEC    PROC=PTRCHECK,COND=(0,EQ)
//ICDDNAME          DD DISP=SHR,
//   DSN=IMSVS.DHVNTZ02.HIDAM.IC.IC130600
//N01   EXEC    PROC=DFSKARC0,COND=(0,NE,S01)
//CONTROL DD *
    STRTTIME=20073121311270
    STOPTIME=20073142100000
//****************************************
//S02 EXEC PROC=PTRCHECK,COND=(0,EQ)
//ICDDNAME          DD DISP=SHR,
//   DSN=IMSVS.DHVNTZ02.HIDAM.IC.IC130500
//N02   EXEC    PROC=DFSKARC0,COND=(0,NE,S02)
//CONTROL DD *
    STRTTIME=20073121309156
    STOPTIME=20073142100000
//****************************************
//S03 EXEC PROC=PTRCHECK,COND=(0,EQ)
//ICDDNAME          DD DISP=SHR,
//   DSN=IMSVS.DHVNTZ02.HIDAM.IC.IC130400
//N03   EXEC    PROC=DFSKARC0,COND=(0,NE,S03)
//CONTROL DD *
    STRTTIME=20073121306354
    STOPTIME=20073142100000
//****************************************
```

In one embodiment, an execution module 220 executes each JCL code block to identify the youngest IC without database errors. As noted above, PROC=PTRCHECK operates a pointer checker utility. In this instance, the pointer checker is run against each IC. If the pointer checker utility terminates with condition code zero, the IC is free from errors. If the pointer checker utility terminates with a non-zero code, the IC contains errors, and the JCL code moves to the next IC.

When the generated JCL is executed, each step may run in succession. The parameter COND=(0,EQ) indicates the condition in which this step is not to be run. Therefore, the execution module 220 will not run such a step if the prior step terminates with condition code zero. As a result, the first step to complete with zero will be the last step to execute and will identify the youngest error free IC data set.

In one embodiment, a log list module 222 of a mainframe RECON Query of Log Data Set Names utility (DFSKARC0) locates the log data sets associated with the youngest error free IC once the pointer checker has terminated with code zero. DFSKARC0 generates the list of OLDS 110, SLDS 126, or RLDS logs by first issuing a LIST.LOG command, which drives DBRC 112 to create a log report. Example Output 2 displays possible output from a LIST.LOG command:

EXAMPLE OUTPUT 2

```
PRISLD                                RECORD SIZE=  1424
START = 07.313 06:46:47.4      *      SSID=IMSA    VERSION=9.1
STOP  = 07.313 18:01:39.5             #DSN=8
GSGNAME=NULL
```

EXAMPLE OUTPUT 2

```
FIRST RECORD ID= 00000002408631A6      PRILOG TOKEN= 0
DSN=B2.IMSA.OLOG1.D07020.T082037              UNIT=VSDE
START = 07.313 06:46:47.4              FIRST DS LSN= 00000002408631A6
STOP = 07.313 08:20:37.0               LAST DS LSN= 0000000240B4E59C
FILE SEQ=0001    #VOLUMES=0001
CHECKPOINT TYPES=C0: SIMPLE=Y SNAPQ=Y DUMPQ=N PURGE=N FREEZE=N
    VOLSER=V46840 STOPTIME = 07.313 08:20:37.0
        CKPTCT=2   CHKPT ID = 07.313 07:48:06.4
        LOCK SEQUENCE#= C0083F2F0103
DSN=B2.IMSA.OLOG1.D07020.T091521              UNIT=VSDE
START = 07.313 08:20:37.0              FIRST DS LSN= 0000000240B4E59D
STOP = 07.313 09:15:21.5               LAST DS LSN= 0000000240E20188
FILE SEQ=0001    #VOLUMES=0001
CHECKPOINT TYPES=C0: SIMPLE=Y SNAPQ=Y DUMPQ=N PURGE=N FREEZE=N
    VOLSER=V73563 STOPTIME = 07.313 09:15:21.5
        CKPTCT=2   CHKPT ID = 07.313 08:48:06.6
        LOCK SEQUENCE#= C0084B6B5052
DSN=B2.IMSA.OLOG1.D07020.T101013              UNIT=VSDE
START = 07.313 09:15:21.5              FIRST DS LSN= 0000000240E20189
STOP = 07.313 10:10:13.7               LAST DS LSN= 00000002410E6109
FILE SEQ=0001    #VOLUMES=0001
CHECKPOINT TYPES=C0: SIMPLE=Y SNAPQ=Y DUMPQ=N PURGE=N FREEZE=N
    VOLSER=V86362 STOPTIME = 07.313 10:10:13.7
        CKPTCT=2   CHKPT ID = 07.313 09:48:06.4
        LOCK SEQUENCE#= C00857AF008A
```

The DFSKARC0 utility may parse the LIST.LOG output to obtain the log data sets recorded between the time the error was detected and the runtime for the IC referenced in the JCL. The log list module 222 may save these log data sets into another work data set.

In one embodiment, a log extraction module 224 extracts an evaluation list of log data sets directly related to the failed database at issue and pointer errors affecting the database. The log extraction module 224 may input or read the list of pointer errors for the failed IMS database 118 obtained by the error detection module 212. Using this list, the log extraction module 224 may extract the IMS database log records with a change operation identifier indicating that an update or other similar operation was performed for the pointer errors referenced from the list. In one embodiment, the identifier is the ID in the "log type" field of the IMS log record. Two such IDs are x'50', which identify the update records for IMS Full Function Databases, and x'59', which identify the update records for Fast Path databases. However, any other indicator of an update operation may be used for extraction by the log extraction module 224 including IDs used in other database systems.

The log extraction module 224 may filter out thousands of IMS records to obtain the records that a database administrator would be most interested in: those records involving the failed database, associated with the errors, and involving update operations.

In some embodiments, the pointer error data extractor 112 may also comprise an output module 226. The output module 226 may send all or part of the evaluation log list obtained from the log extraction module 224 to a service center for analysis. The database operators may choose to further analyze and narrow the error logs if necessary. The output module 226 may send the evaluation log list by File Transfer Protocol (FTP), email, or any form of electronic communication.

In addition, the output module 226 may incorporate all or part of the output of the log list module 222 of the DFSKARC0 utility into a pre-constructed email or other electronic messenging format and send the output to a predetermined receiver. For example, a customer may desire to know of the range of database activity affected by the recent failure. In addition this email can be used to help the customer to identify the resources necessary to "reconstruct" the broken database to minimize the loss of information.

Figure 3:
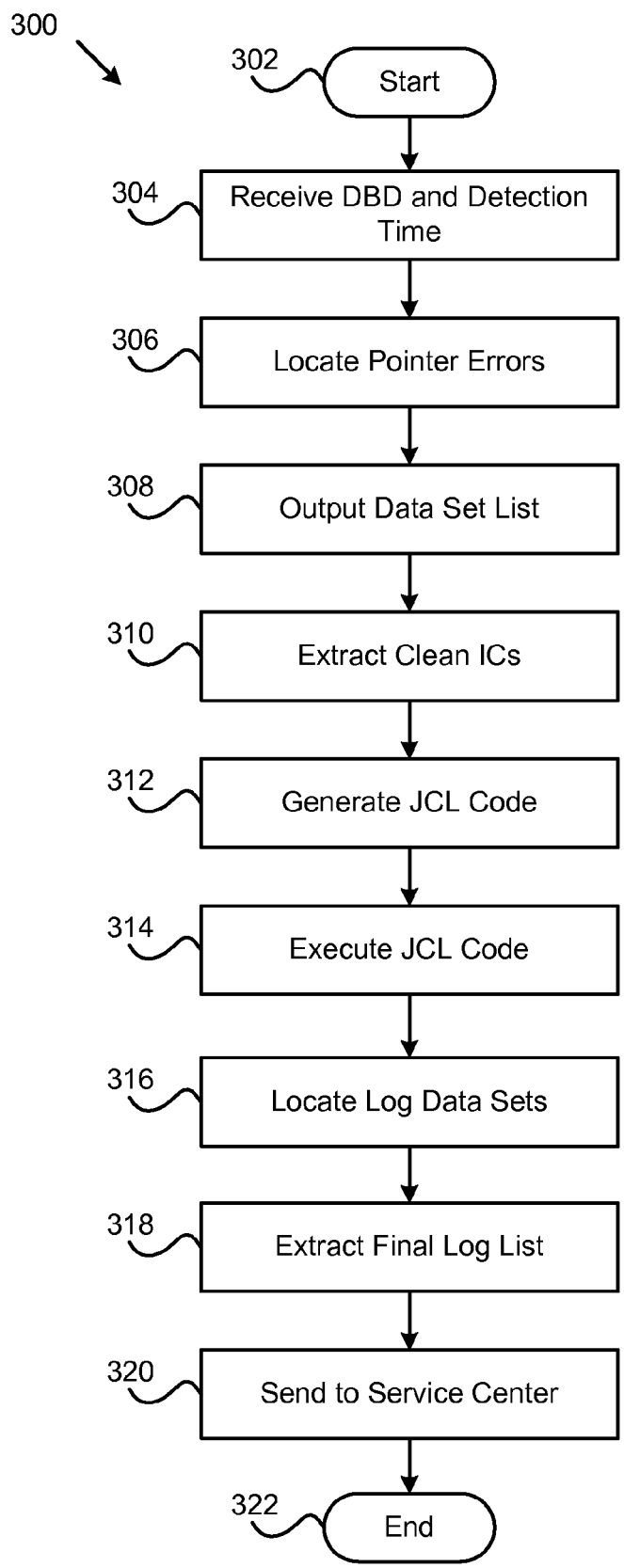
FIG. 3 is a high-level schematic block diagram illustrating one embodiment of a method for autonomic IMS database pointer error diagnostic data extraction.

Referring now to FIG. 3, one method 300 is represented for autonomic IMS database pointer error diagnostic data extraction. Specifically, the method 300 starts 302 when the receiving module 210 receives 304 the database name of a failed IMS database and the time the error was first detected. Next, the error detection module 212 locates 306 one or more database pointer errors which exist on the failed IMS database using a pointer checker utility. Next, the list module 214 generates 308 an IC list corresponding to the failed IMS database using the LIST.DBDS command. The list may include entries for each IC data set with a DSN and run time timestamp associated with each IC data set.

The IC extraction module 216 extracts 310 entries in the IC list which correspond to a clean IC. The code generation module 218 then generates 312 a JCL code block for the clean ICs from the IC list. Next, the execution module 220 executes 314 each JCL code block. As part of this process, the log list module 222 locates 316 the log data sets recorded between the error detection time and the runtime timestamp associated with the clean IC by using the DFSKARC0 utility after receiving a successful pointer checker return code on the most recent clean IC.

Next, the log extraction module 224 extracts 318 an evaluation log list, the evaluation list comprising one or more evaluation log data sets with a change operation identifier and at least one database pointer error. Finally, the output module 226 sends 320 at least a portion of the evaluation log list to a service center. Then, the method 300 ends 322.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for autonomic Information Management System (IMS) mainframe: database pointer error diagnostic data extraction, the method comprising:
   a receiving module configured to receive a database name and an error detection time, the database name corresponding to a failed Information Management System (IMS) database;
   an error detection module of a pointer checker utility configured to locate one or more database pointer errors, the one or more database pointer errors corresponding to the failed IMS database;
   a list module configured to utilize an IMS Data Base Recovery Control facility (DBRC) LIST.DBDS command to generate an Image Copy (IC) list corresponding to the failed IMS database, the IC list comprising one or more entries, the one or more entries ordered from youngest to oldest in time, each entry comprising a runtime timestamp and IC data set name;
   an IC extraction module configured to extract one or more entries in the IC list, each extracted entry corresponding to a clean IC, each clean IC comprising a BATCH IC;
   a code generation module configured to generate a Job Control Language (JCL) code block for each clean IC, the JCL code block configured to reference the runtime timestamp and the IC data set name of the clean IC from the entry in the IC list corresponding to the clean IC;
   an execution module configured to execute each JCL code block so long as the JCL code block returns an unsuccessful pointer checker return code, the JCL code block configured to operate an IC pointer checker utility on each clean IC;
   a log list module of a mainframe RECON Query of Log Data Set Names utility (DFSKARC0) configured to locate one or more log data sets in response to a successful pointer checker return code on the youngest clean IC, the one or more log data sets recorded between the error detection time and the runtime timestamp from the entry associated with the youngest clean IC; and
   a log extraction module configured to extract an evaluation log list, the evaluation list comprising one or more evaluation log data sets, each evaluation log data set comprising a change operation identifier and at least one of the one or more database pointer errors.

2. The method of claim 1, further comprising an output module configured to send at least a portion of the evaluation log list to a service center.

3. The method of claim 2, wherein the output module is further configured to send an affected data set list to a predetermined receiver.

4. A system for autonomic Information Management System (IMS) mainframe database pointer error diagnostic data extraction, the system comprising:
   a network configured to communicate data between a plurality of devices;
   an Information Management System (IMS) in communication with the network;
   a diagnostic server in communication with the network, the diagnostic server comprising:
      a receiving module configured to receive a database name and an error detection time, the database name corresponding to a failed Information Management System (IMS) database;
      an error detection module of a pointer checker utility configured to locate one or more database pointer errors, the one or more database pointer errors corresponding to the failed IMS database;
      a list module configured to utilize an an IMS Data Base Recovery Control facility (DBRC) LIST.DBDS command to generate a Image Copy (IC) list corresponding to the failed IMS database, the IC list comprising one or more entries, the one or more entries ordered from youngest to oldest in time, each entry comprising a runtime timestamp and IC data set name;
      an IC extraction module configured to extract one or more entries in the IC list, each extracted entry corresponding to a clean IC;
      a code generation module configured to generate a Job Control Language (JCL) code block for each clean IC, the JCL code block configured to reference the runtime timestamp and the IC data set name of the clean IC from the entry in the IC list corresponding to the clean IC;
      an execution module configured to execute each JCL code block so long as the JCL code block returns an unsuccessful pointer checker return code, the JCL code block configured to operate an IC pointer checker utility on each clean IC;
      a log list module of a mainframe RECON Query of Log Data Set Names utility (DFSKARC0) configured to locate one or more log data sets in response to a successful pointer checker return code on the youngest clean IC, the one or more log data sets recorded between the error detection time and the runtime timestamp from the entry associated with the youngest clean IC; and
      a log extraction module configured to extract an evaluation log list, the evaluation log list comprising one or more log data sets, each log data set comprising a change operation identifier and at least one of the one or more database pointer errors.

5. The system of claim 4, wherein the diagnostic server further comprises an output module configured to send at least a portion of the evaluation log list to a service center.

6. The system of claim 5, wherein the output module is further configured to send an affected data set list to a predetermined receiver.

* * * * *